United States Patent [19]
Hein

[11] 3,864,422

[45] Feb. 4, 1975

[54] CYCLOPENTADIENE REMOVAL FROM ISOPRENE PROCESS STREAMS

[75] Inventor: Richard W. Hein, Hudson, Ohio

[73] Assignee: The B. F. Goodrich Company, New York, N.Y.

[22] Filed: Sept. 26, 1973

[21] Appl. No.: 400,728

[52] U.S. Cl.............. 260/681.5 R, 203/38, 203/62
[51] Int. Cl............................................. C07c 7/04
[58] Field of Search.......... 203/38, 62; 260/681.5 R

[56] References Cited
UNITED STATES PATENTS

| | | | |
|---|---|---|---|
| 2,982,796 | 5/1961 | Veal.............................. | 260/681.5 |
| 3,347,948 | 10/1967 | Featherstone.................... | 260/681.5 |
| 3,804,911 | 4/1974 | Liakumovich et al........ | 260/681.5 R |

*Primary Examiner*—Paul M. Coughlan, Jr.

[57] ABSTRACT

An isoprene stream containing cyclopentadiene is contacted with benzoquinone or naphthoquinone to react with the cyclopentadiene and the stream is fractionated to reduce cyclopentadiene content.

3 Claims, No Drawings

CYCLOPENTADIENE REMOVAL FROM ISOPRENE PROCESS STREAMS

BACKGROUND OF THE INVENTION

It is well known that small quantities of impurities can affect substantially and unfavorably the polymerization of olefin monomers to high molecular weight polymers. More particularly, stereospecific polymerization reactions of isoprene, such as high cis-1,4-polyisoprene preparation by Ziegler catalysis, are affected adversely by trace amounts of acetylenes and cyclopentadiene. For example, cyclopentadiene slows the isoprene polymerization rate unless compensated by use of additional catalyst; moreover, cyclopentadiene causes an induction period in which no polymer is formed, even when more than enough catalyst is present.

Therefore, it is highly desirable to remove as much of these impurities as is economically possible during the production of isoprene for stereospecific polymerization. Acetylenes are removed conveniently by distillation, treatment with sodium, selective hydrogenation and other methods known to those skilled in the art. However, it has been found that cyclopentadiene reduction to the desired level (less than 1 ppm) by distillation and fractionation alone is very difficult, particularly when initial cyclopentadiene concentration is above about 0.3% by weight; an excessive amount of fractionation is required, and distillation column output is reduced because of required high reflux ratios.

Moreover, prior attempts to remove cyclopentadiene by some chemical treatments such as sodium and hydrogenation caused excessive isoprene loss because of isoprene reaction with the chemical agent or isoprene polymerization catalyzed by the chemical agent. Other chemical agents, such as the dienophile maleic anhydride used as taught in British Pat. No. 887,908, are less effective in "wet" isoprene process streams. A new method is desired to overcome these prior art disadvantages.

SUMMARY OF THE INVENTION

The method of the present invention comprises contacting an isoprene stream generally containing from about 0.1% to about 2% by weight cyclopentadiene with benzoquinone or naphthoquinone in a molar ratio of from about 0.5/1 to about 4/1 of benzoquinone or naphthoquinone to cyclopentadiene. A cyclopentadiene adduct is formed with benzoquinone or naphthoquinone, and the stream is fractionated to reduce cyclopentadiene content to a level suitable for stereospecific polymerization.

DESCRIPTION OF THE INVENTION

The method of the present invention comprises contacting an isoprene stream generally containing from about 0.1% to about 2% by weight cyclopentadiene with benzoquinone or naphthoquinone in a molar ratio of from about 0.5/1 to about 4/1 of benzoquinone or naphthoquinone to cyclopentadiene. A cyclopentadiene adduct is readily formed with benzoquinone or naphthoquinone and the stream is fractionated to reduce cyclopentadiene content to a level suitable for stereospecific polymerization. More preferably, the isoprene stream is contacted with benzoquinone or naphthoquinone in a molar ratio of from about 1.5/1 to about 3/1 of benzoquinone or naphthoquinone to cyclopentadiene for reaction of cyclopentadiene with benzoquinone or naphthoquinone to form a high boiling adduct and the stream is fractionated to reduce cyclopentadiene content to a level suitable for stereospecific polymerization.

The reaction between benzoquinone or naphthoquinone and cyclopentadiene may be carried out in a batch or continuous process by conventional techniques, either in the fractionation column or in a separate vessel before final fractionation. One preferred mode of operation comprises contacting in the fractionation column and removal of the adduct as a "bottoms" sediment. The reaction is conducted at a temperature of from about 10°C to about 95°C, more preferably from about 40°C to about 65°C. Generally, reaction with cyclopentadiene occurs much more readily at higher benzoquinone or naphthoquinone concentrations and at higher temperatures. Although the process of this invention may be used for cyclopentadiene concentrations in excess of about 2% by weight, it is generally preferable to use preliminary fractionation and/or heat treatment methods known to those skilled in the art for removal of such a cyclopentadiene excess. In any case, cyclopentadiene level may be reduced to less than about 10 ppm by treatment with benzoquinone or naphthoquinone and to less than about 1 ppm by this treatment together with fractionation.

Benzoquinone or naphthoquinone may be used in either the 1,4 or 1,2 isomeric forms. Parabenzoquinone is more prefered because benzoquinone is more soluble and more reactive than naphthoquinone, and the 1,4 isomer is more readily available than the 1,2 isomer. Benzoquinone or naphthoquinone may be added to isoprene in the solid state or dissolved in a nonazeotrope forming solvent which boils higher than isoprene, such as hexane, heptane, octane, diisoamylene and the like. Addition of a solution is a preferred method because dissolution and reaction occur more rapidly. These compounds effectively remove cyclopentadiene from isoprene streams containing from 0% up to about saturation with water. The streams may also contain up to about 1% free water such as is present when a sodium nitrite solution in water is used for the purpose of oxygen removal from the streams.

It is known in the art that a diene such as isoprene reacts with dieneophiles. This is the Diels-Alder reaction. One skilled in the art would expect large losses of isoprene when a mixture of isoprene and cyclopentadiene is mixed with benzoquinone or naphthoquinone; therefore, it was surprising to find the high selectivity of the reaction of the contaminant cyclopentadiene even in the presence of large excesses of isoprene with only minimum reaction of isoprene.

Dienophiles which were relatively ineffective in comparison to benzoquinone in removing cyclopentadiene from isoprene included methyl red, 2-methylbutynol-2, 4(4'-nitrophenylazo)resorcinal, mono-potassium butyndioic acid, 1,1'-bisazo-formamide, 1-nitroso-2-naphthol, n-butyl acrylate and acrylonitrile.

As stated heretofore, the substantially cyclopentadiene-free (less than about 1 ppm) isoprene produced in the process of this invention is useful in stereospecific polymerization reactions such as the preparation of synthetic rubber (high cis-1,4-polyisoprene).

The following example illustrates the present invention more fully.

EXAMPLE

A typical process stream from an isoamylene dehydrogenation unit and the subsequent fractionation equipment, containing about 1% cyclopentadiene by weight and about 90% isoprene by weight, was contacted with about 2.5% benzoquinone by weight. The benzoquinone, prior to mixing with the isoprene stream, was maintained in a solution to facilitate its introduction into the isoprene. The isoprene-benzoquinone mixture was agitated at about 60°C for 45 minutes and sampled at 15 minute intervals. Each sample was filtered to remove the cyclopentadiene-benzoquinone adduct and then analyzed by gas chromatography. Cyclopentadiene level was found to be 10,000, 830, 310, and 10 ppm by weight of isoprene after 0, 15, 30 and 45 minutes, respectively. The isoprene was transferred to a fractionating column where the cyclopentadiene content was reduced further by fractionation to less than 1 ppm as determined by gas chromatography.

Similar results are obtained when naphthoquinone is used in place of benzoquinone.

I claim:
1. A process for the removal of cyclopentadiene from isoprene comprising (A) contacting isoprene containing from about 0.1% to about 2% by weight cyclopentadiene with a compound selected from the group consisting of benzoquinone and naphthoquinone to form a high boiling adduct and (B) removing said adduct from said isoprene by fractionation, thereby reducing cyclopentadiene level in said isoprene to less than 1 ppm, wherein said isoprene contains from 0% water up to about saturation with water and beyond to about 1% free water, benzoquinone or naphthoquinone is in a molar ratio to cyclopentadiene of from about 0.5/1 to about 4/1, and said contacting occurs at a temperature from about 10°C. to about 95°C.

2. A process of claim 1 wherein said benzoquinone or naphthoquinone is in a molar ratio to cyclopentadiene of from about 1.5/1 to about 3/1, and said contacting occurs at a temperature from about 40°C. to about 65°C.

3. A process of claim 2 wherein said benzoquinone is para-benzoquinone.

* * * * *